UNITED STATES PATENT OFFICE.

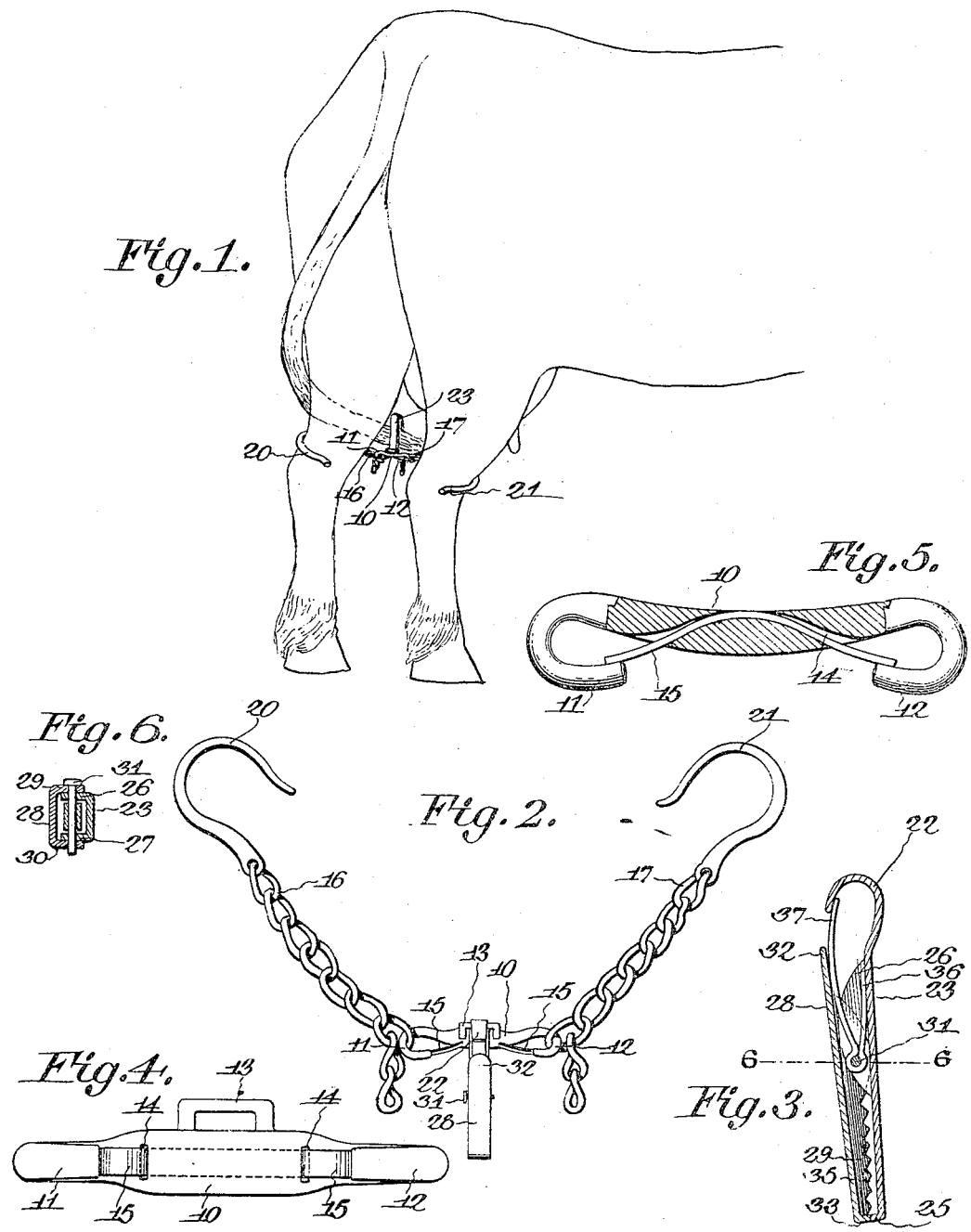

JOHN G. CONNELL, OF HOQUIAM, WASHINGTON.

COMBINED HOPPLE AND TAIL-HOLDER.

No. 800,794.        Specification of Letters Patent.        Patented Oct. 3, 1905.

Application filed May 1, 1905. Serial No. 258,261.

*To all whom it may concern:*

Be it known that I, JOHN G. CONNELL, a citizen of the United States, residing at Hoquiam, in the county of Chehalis and State of Washington, have invented a new and useful Combined Hopple and Tail-Holder, of which the following is a specification.

This invention relates to combined tail-holders and hopples for attachment to cows while being milked, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a view of a portion of a cow with the improved device applied. Fig. 2 is a detached side elevation, enlarged, of the improved device. Fig. 3 is a sectional detail, enlarged, of the tail-holding member of the device. Fig. 4 is a front elevation, and Fig. 5 is a longitudinal sectional elevation, of the coupling member enlarged. Fig. 6 is a section, enlarged, on the line 6 6 of Fig. 3.

The improved device comprises a bar 10, having hooks 11 12 at the ends and with an intermediate lateral loop 13 and also with a curved longitudinal aperture 14. Engaging this aperture 14 is a bent spring-bar 15, extending at the ends into engagement with the inner faces of the hooks 11 12, and thereby forming yieldable closure-tongues across the entrances to the hooks, the one spring thus serving as closure-tongues to both the hooks 11 12. Two chains 16 17 form a part of the improved structure and are adapted to be engaged adjustably with the hooks 11 12 by their links and provided with terminal hooks 20 21 large enough to pass partly around the legs of a cow just above the gambrel-joints. Swinging by a hook 22 from the loop 13 is a bar 23, having a jaw at the free end and bent inwardly, as at 25, and also provided with inwardly-extending spaced sides 26 27. Disposed in front of the member 23 is an opposing member 28, having spaced laterally-extending sides 29 30, embracing the sides 26 27 of the member 23 and coupled movably thereto by a pivot-pin 31. The inner end 32 of the member 28 approaches the free end of the hook 22, while the outer end is bent inwardly, as at 33, to meet the bent portion 25 of the member 23. The side portions 29 30 of the member 28 are continued to the bent portion 33 and formed with serrations, as at 35, to increase the "grip" between the jaws.

A spring is disposed between the members 23 28 to maintain their jaw ends yieldably in contact, the spring being formed of a flat plate folded together around the pin 31, with one leg 36 bearing against the inner face of the member 23 and the other leg 37 bearing against the inner face of the portion 32 of the member 28 and also extended for bearing against the inner face of the hook 22, as shown more clearly in Fig. 3, to form a yieldable closure-tongue to the latter. The spring 36 37 thus serves the twofold purpose of a means for holding the jaws 25 33 yieldably in contact and also as the yieldable closure-tongue to the hook 22. The member 23, with its attachments, may thus be "snapped" into connection with the loop 13 and be held in place thereon by the spring-tongue 37, as will be obvious.

The jaw members 25 33 are designed for grasping the long hairs at the tip end of the cow's tail, as represented in Fig. 1, and will hold it with sufficient force to prevent the animal from switching it into the face of the person who is milking or into the milk-pail, while the hopple-chains effectually prevent the animal from kicking or moving about.

The device is simple in construction, can be strongly and inexpensively manufactured, and may be readily adapted to any size of cow by simply adjusting the terminal hooks 20 21 in the links of the chains 16 17.

Having thus described the invention, what is claimed is—

1. In a device of the class described, a bar having reversely-disposed hooks at the ends and with a longitudinal aperture between the hooks and with a lateral loop, a spring member engaging said aperture and projecting at the ends to form yieldable closure-tongues to said hooks, a member for removably engaging said loop and having oppositely-disposed movable jaws, and yieldable closing means operating upon said jaws.

2. In a device of the class described, a bar having oppositely-disposed hooks at the ends and with a lateral loop between the hooks, yieldable closure-tongues for said hooks, and a member movably engaging said loop and having oppositely-operating jaws provided with a yieldable closing means.

3. In a device of the class described, a bar having oppositely-disposed hooks at the ends and with yieldable closure to said hooks, a member swinging laterally from said bar and terminating in oppositely-disposed jaws, and yielding closing means operating upon said jaws.

4. In a device of the class described, a bar having oppositely-disposed hooks at the ends and with a lateral loop between the hooks, yieldable closure-tongues to said hooks, a member having a hook at one end for engaging said loop and a stationary jaw member at the other end, an opposing jaw member movably connected to said stationary jaw member and operating against the same, and means for holding said jaw members yieldably closed.

5. In a device of the class described, a bar having oppositely-disposed hooks at the ends and with a lateral loop between the hooks, yieldable closure-tongues for said hooks, a member having a hook at one end for engaging said loop and a stationary jaw member at the other end, an opposing jaw member movably connected to said stationary jaw member and operating against the same, means for holding said jaw members yieldably closed, and a yieldable closure-tongue between said hooked member and said loop.

6. In a device of the class described, a bar having oppositely-disposed hooks at the ends and with a lateral loop between the hooks, yieldable closure-tongues for said hooks, two members having spaced sides and with opposing gripping-jaws at one end and with a hook at the other end of one of the members for removably engaging said loop, a pivot-pin disposed transversely through said spaced sides, and a spring engaging said pivot-pin and operating to hold said gripping-jaws yieldably in closed position, with one side of the spring extended to form a closure-tongue to said loop-hook.

7. In a device of the class described, a bar having oppositely-disposed hooks at the ends and with yieldable closure-tongues for said hooks, a member swinging laterally from said bar and terminating in oppositely-disposed jaws, yielding closing means operating upon said jaws, and chains having terminal hooks and adapted for movably engaging said bar-hooks by their links.

In testimony that I claim the foregoing as my own I have hereto affixed my signature in the presence of two witnesses.

JOHN G. CONNELL.

Witnesses:
NETTIE M. TAYLOR,
A. M. DINEEN.